(12) United States Patent
Burnette, Jr.

(10) Patent No.: US 9,366,429 B2
(45) Date of Patent: Jun. 14, 2016

(54) METHOD AND SYSTEM FOR PROCESSING ANIMAL WASTE

(75) Inventor: Rucker Preston Burnette, Jr., Greensboro, NC (US)

(73) Assignee: FARM PILOT PROJECT COORDINATION, INC., Tampa, FL (US)

( * ) Notice: Subject to any disclaimer, the term of this patent is extended or adjusted under 35 U.S.C. 154(b) by 667 days.

(21) Appl. No.: 13/449,476

(22) Filed: Apr. 18, 2012

(65) Prior Publication Data

US 2013/0277975 A1  Oct. 24, 2013

(51) Int. Cl.
| | |
|---|---|
| *C01B 3/36* | (2006.01) |
| *F23G 5/46* | (2006.01) |
| *F23G 5/027* | (2006.01) |
| *F23G 5/44* | (2006.01) |
| *F01K 25/08* | (2006.01) |
| *F01D 15/10* | (2006.01) |

(52) U.S. Cl.
CPC *F23G 5/46* (2013.01); *F01D 15/10* (2013.01); *F01K 25/08* (2013.01); *F23G 5/0276* (2013.01); *F23G 5/444* (2013.01); *F23G 2900/7003* (2013.01); *Y02E 20/12* (2013.01); *Y02E 20/14* (2013.01)

(58) Field of Classification Search
CPC .......... F23G 2900/7003; F23G 5/0276; F23G 5/444; F23G 5/46; Y02E 20/12
See application file for complete search history.

(56) References Cited

U.S. PATENT DOCUMENTS

| | | | | |
|---|---|---|---|---|
| 2008/0308017 A1* | 12/2008 | Brookes | ........................ | 110/212 |
| 2010/0105127 A1* | 4/2010 | Ginsburg | ...................... | 435/262 |
| 2010/0107494 A1* | 5/2010 | Raynaud et al. | ............. | 48/86 R |
| 2011/0036014 A1* | 2/2011 | Tsangaris et al. | ............. | 48/62 R |

FOREIGN PATENT DOCUMENTS

DE        102008059182 A1 *  6/2010

OTHER PUBLICATIONS

Machine Translation of DE 102008059182 A1.*
Translation of Schaad DE 102008059182.*

* cited by examiner

*Primary Examiner* — Imran Akram
(74) *Attorney, Agent, or Firm* — Matthew G. McKinney, Esq.; Allen, Dyer, Doppelt, Milbrath & Gilchrist, P.A.

(57) ABSTRACT

A method and system of processing animal waste is disclosed. In a particular embodiment, the method includes transferring animal waste to a gasifier to burn the animal waste, circulating water through a heat exchanger in a flue stack of the gasifier to generate heated water, and pumping the heated water to either an organic Rankine cycle system to generate electricity, a radiant heater, or any combination thereof. In addition, the method includes circulating the heated water through an evaporator of the organic Rankine cycle system to vaporize a refrigerant, and circulating the vaporized refrigerant from the evaporator, through a turbine to generate the electricity. Also, the method includes using a manure spreader to feed the animal waste to the gasifier at a varying feed rate that is based on contemporaneously calculating a British thermal units (BTU) of the animal waste being fed to the gasifier.

6 Claims, 5 Drawing Sheets

METHOD AND SYSTEM FOR PROCESSING ANIMAL WASTE

I. FIELD

The present disclosure is generally related to a method and system for processing animal waste.

II. BACKGROUND

Poultry litter is primarily disposed of through land application. This traditional approach creates problems with odor, transportation costs and does not harness the energy potential of the waste stream at the farm. Increasingly, risks of over-application and surface water contamination have been highlighted. For example, in South Carolina, there are an estimated 181 permitted turkey facilities and 556 poultry facilities producing an estimated combined 692, 414 tons of poultry litter.

Most states have adopted tougher water quality and environmental regulations that restrict and limit the amount of poultry litter that can be land applied based on the amount of nutrients required for crops and soil conditions. These actions, while environmentally sound, limit the amount of manure solids (i.e., poultry litter) that farmers may apply to their land, which imposes an economic burden on the farmer. Further, the composition of the waste varies significantly from location to location and with different types of agricultural operations being performed.

Other methods have been developed to dispose of animal waste by burning and land applying the ash. The energy value of poultry litter is approximately 3,500 BTU/lb. Thus, poultry litter represents a form of biomass with enormous potential as a source of renewable energy. Capitalizing on the large amount of untapped energy source in poultry litter could potentially displace a portion of the country's dependence on imported fossil fuels. However, prior art methods and systems require high temperatures to reduce the waste to ash by combustion. Although, the volume of animal waste is reduced by transforming the waste to ash, such prior art systems are inefficient and are not capable of providing multiple forms of energy from processing animal waste in an environmentally friendly manner.

Accordingly, what is needed in the art is an improved method and system for processing animal waste that has increased efficiency and also has an ability to provide multiple forms of energy.

III. SUMMARY

In a particular embodiment, a method of processing animal waste is disclosed. The method includes transferring animal waste to a gasifier to burn the animal waste, circulating water through a heat exchanger in a flue stack of the gasifier to generate heated water, and pumping the heated water to either an organic Rankine cycle system to generate electricity, a radiant heater, or any combination thereof. In addition, the method includes circulating the heated water through an evaporator of the organic Rankine cycle system to vaporize a refrigerant and circulating the vaporized refrigerant from the evaporator, through a turbine to generate the electricity. Also, the method includes using a manure spreader to feed the animal waste to the gasifier at a varying feed rate that is based on contemporaneously calculating British thermal units (BTU) of the animal waste being fed to the gasifier to maintain a desired temperature of the gasifier combustion process.

In another particular embodiment, a system of processing animal waste is disclosed. The system includes a manure spreader configured to feed animal waste into a gasifier, a conveyor connecting the manure spreader to the gasifier, and a controller to maintain a desired feed rate of the animal waste to the gasifier. In addition, the system includes an integrated heat exchanger secured to the gasifier, where the heat exchanger uses hot combustion gases from the combustion of the animal waste in the gasifier to heat water as it circulates in a closed loop through the heat exchanger. The gasifier is configured to handle the animal waste at varying levels of energy and moisture that are dependent on a farming operation. An agitator may also be secured to a front loading end of the gasifier to provide an even distribution of the animal waste and shake loose clumps of material into small portions for combustion in the gasifier. The gasifier is configured to burn the animal waste and convert energy from the animal waste to a hot flue gas that passes through the heat exchanger and the heat exchanger transfers a portion of the thermal energy to the closed loop circulating the water. Ash augers may be used to convey ash from a rear of the gasifier to a storage container.

A three way valve may be in fluid communication with the water circulating in the closed loop and used to control the flow of the heated water through the system. For example, the system may also include an organic Rankine cycle system in fluid communication with the three way valve, where the organic Rankine cycle system is configured to generate electricity using the heated water. A radiator may also be in fluid communication with the three way valve, where the radiator is configured to provide ambient heating using the heated water.

Also, a hot water storage tank may be configured to store the heated water until needed. The organic Rankine cycle system uses a refrigerant that operates at a lower operating temperature and pressure than water. An evaporator uses energy from the heated water to vaporize the refrigerant and a condenser cools the refrigerant to return the refrigerant to a liquid state.

Other aspects, advantages, and features of the present disclosure will become apparent after review of the entire disclosure, including the following sections: Brief Description of the Drawings, Detailed Description, and the Claims.

IV. BRIEF DESCRIPTION OF THE DRAWINGS

V. DETAILED DESCRIPTION

A method and system to process animal waste is disclosed. The method and system processes organic material in the animal waste, for example poultry litter, into a usable energy source such as heat and electricity. Electricity generated by the method and system may be used on a farm or sold to the electrical grid for use by the local community or town, thus reducing the utilities burden to generate electricity with conventional means such as burning coal to generate electricity. The method and system includes a storage and feeding system for the animal waste, a combustion system, a heat exchanger designed to transfer the thermal energy from the animal waste to clean water, and an organic Rankine cycle system designed to convert the thermal energy in the hot water to electricity.

The British thermal units (BTU) generated with the method and system may be utilized for heating applications and alternately for power generation for cooling ventilation fans peaking during the summer Alternate energy derived from animal waste (e.g., poultry litter manure mixture) may displace peak fossil fuel usage of propane and electricity consumption while substantially improving nutrient management practices at a farm.

Thermal energy generated from the gasifier may be used to heat water which will be directed (in a bi-modal way) to either satisfy peak heating requirements of the poultry production houses, for example, or to the organic Rankine cycle unit for conversion to electricity. Electric power may be routed to satisfy farm needs for electricity, for example, ventilation fans and lighting.

One advantage of the bi-modal system of providing energy in the form of electricity or heating, is the ability to switch to the type of energy needed as the demand arises. For example, poultry litter is collected once a year from the rooster and pullet houses and twice a year from the nest egg houses. Accordingly, the litter will have to be stored in a typical litter shed. The amount of manure from each type of house varies with the nest egg houses producing 67% of the litter, the pullet houses producing 18%, and the rooster houses producing 15% of the litter (mass basis), for example. As organic material changes with time and environment, these changes will affect the energy content of the litter and this will be evaluated so the conditions of the litter as a feedstock going into the gasifier will be consistent and introduced at maximum efficiency for the method and system.

Figure 1:
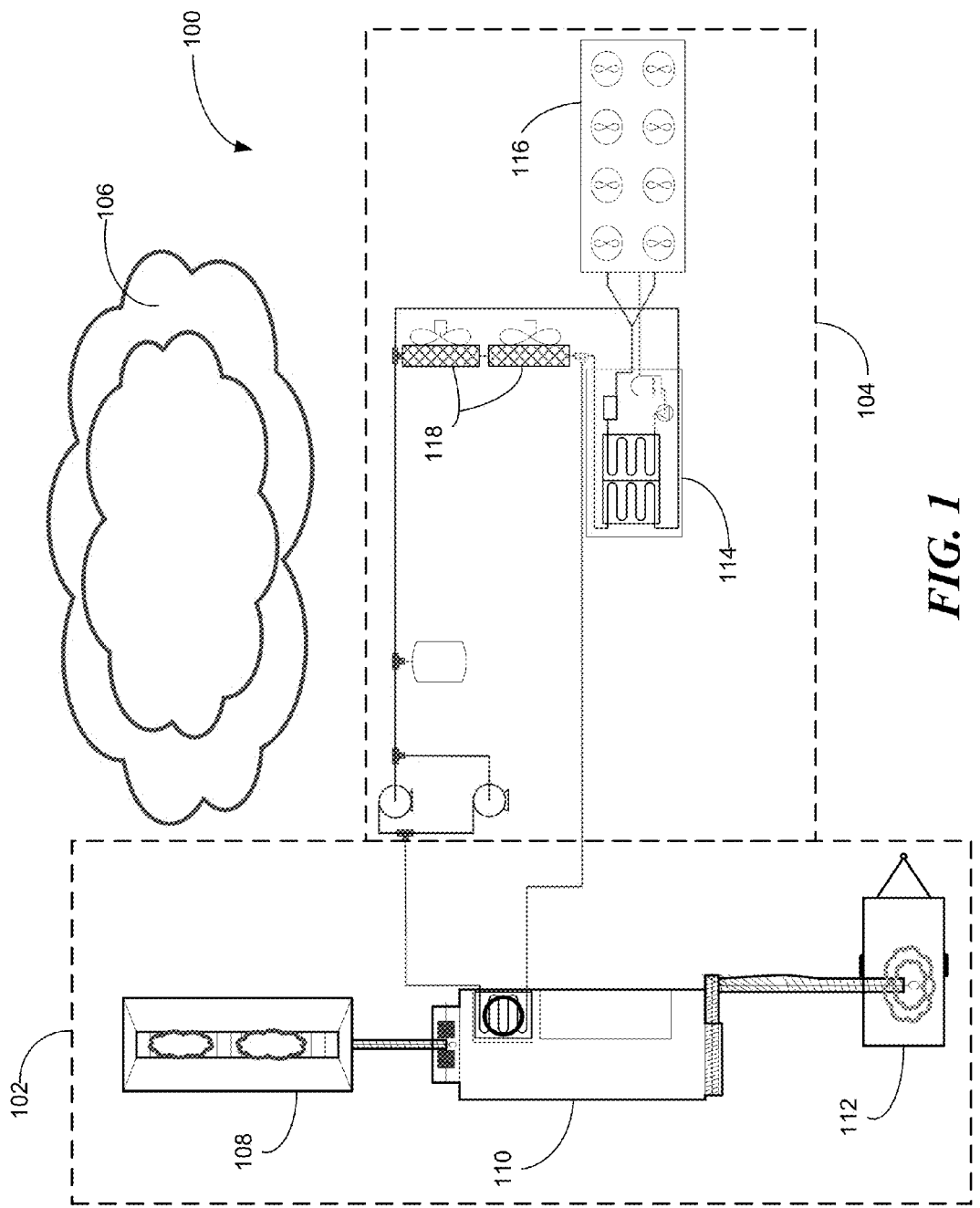
FIG. 1 is a process flow diagram of a particular illustrative embodiment of a system to process animal waste.

Referring now to FIG. 1, a system 100 to process animal waste is disclosed. The system 100 includes a processing system 102, and an electrical generation system 104. The animal waste 106 may be stored in either open or closed sheds commonly used by farmers to store the animal waste 106. It is preferred to keep the animal waste 106 dry and out of the elements. As the animal waste 106 sits in the storage shed it dries out thus producing a better feedstock for the process. For example, a storage facility is needed for poultry farms because the poultry houses are only cleaned out once every year or two years. Accordingly, the animal waste 106 is placed in a controlled environment and in a central place so the animal waste 106 may be transferred to a processing system 102 quickly and easily thus reducing the energy and time required to keep the system 100 running.

A manure spreader 108 may be used in part to feed the animal waste 106 into a gasifier 110. The manure spreader 108 is typically used to spread animal waste 106 over fields but is modified to distribute the animal waste 106 to a conveyor connected to the gasifier 110. The manure spreader 108 may use a variety of mechanisms to drive the conveyor, and is controlled by the main control panel to maintain a desired feed rate of the animal waste 106 to the gasifier 110.

The system 100 may use conventional conveying technologies to convey the animal waste 106 from the manure spreader 108 to the gasifier. Screw augers, drag chains, and belt conveyors are non-limiting examples of conventional conveying technologies that may be used with the system 100. These components must be integrated both in physical connections and controls to properly control the proper feed rate to the gasifier 110.

Gasification is a thermo-chemical process intermediate between pyrolysis and combustion. The limited oxygen input, relative to combustion, combined with the elevated temperature allow the formation of an energy rich product gas rather than fully oxidized products such as $CO_2$ and $H_2O$. Various gasifier designs have been developed to handle feedstocks of widely different physical and chemical properties. They differ according to the method of feedstock introduction, the type of bed material (if used), the operating pressure and temperature, the presence or absence of steam inputs, and whether the reaction heat is supplied internally or externally. Regardless of design, however, they all break down, or crack, the feedstock into carbon monoxide and hydrogen gases, as well as other low molecular weight gases.

Gasification was originally developed for disposal of hazardous hospital waste. Thus, in its development, completeness of disposal and absence of polluting emissions drove the design. It has subsequently been used for mortality disposal in cases such as mad cow disease and foot and mouth disease where the destruction of bioactive compounds such as antibiotic residues, prions, viruses, and other microorganisms must be absolutely complete. The simple, "fool-proof" design makes it ideal for disposal of animal waste where low cost, ease of operation, disposal of waste, and recovery of a safe nutrient-ash product are the principal considerations.

The gasifier 110 may be used with various types of animal manures and other types of biological waste streams and has versatility in the feedstock that it may process. The continuous gasifier 110 has a simple and robust design, and has an ability to extract greater than 95% of the energy from the animal waste (e.g. poultry litter).

Since product gas is combusted, the energy of the system 100 can be captured in many forms. In addition, the gasifier 110 is configured to handle raw unprocessed animal waste 106 at varying levels of energy and moisture that are dependent on the farming operation. The gasifier 110 is selected and used in part to convert the thermal energy stored in the animal waste 106 to other forms of energy. This may be accomplished using an integrated heat exchanger(s) or a separate heat exchanger(s) as described below that is secured to the gasifier 110. The heat exchanger uses the hot combustion gases from the gasification of the animal waste 106 in the gasifier 110 to heat water. The water is circulated in a closed loop through the heat exchanger to generate heated water that is used in an organic Rankine cycle to generate electricity as explained below or to provide ambient heating.

The entire system 100 operates in such a manner to match the energy in the animal waste 106 at a desired feedrate so that the energy balance through the entire system 100 results in a net electrical energy output. For example, as the thermal energy in the animal waste 106 increases (BTU/lb of animal waste), the feedrate (lb/second) into the gasifier 110 decreases. Likewise, as the thermal energy of the animal waste 106 decreases, the feedrate to the gasifier 110 increases. The parasitic loads are considered the sum of all system components that use electricity that did not exist prior to installation of the system 100.

Figure 2:
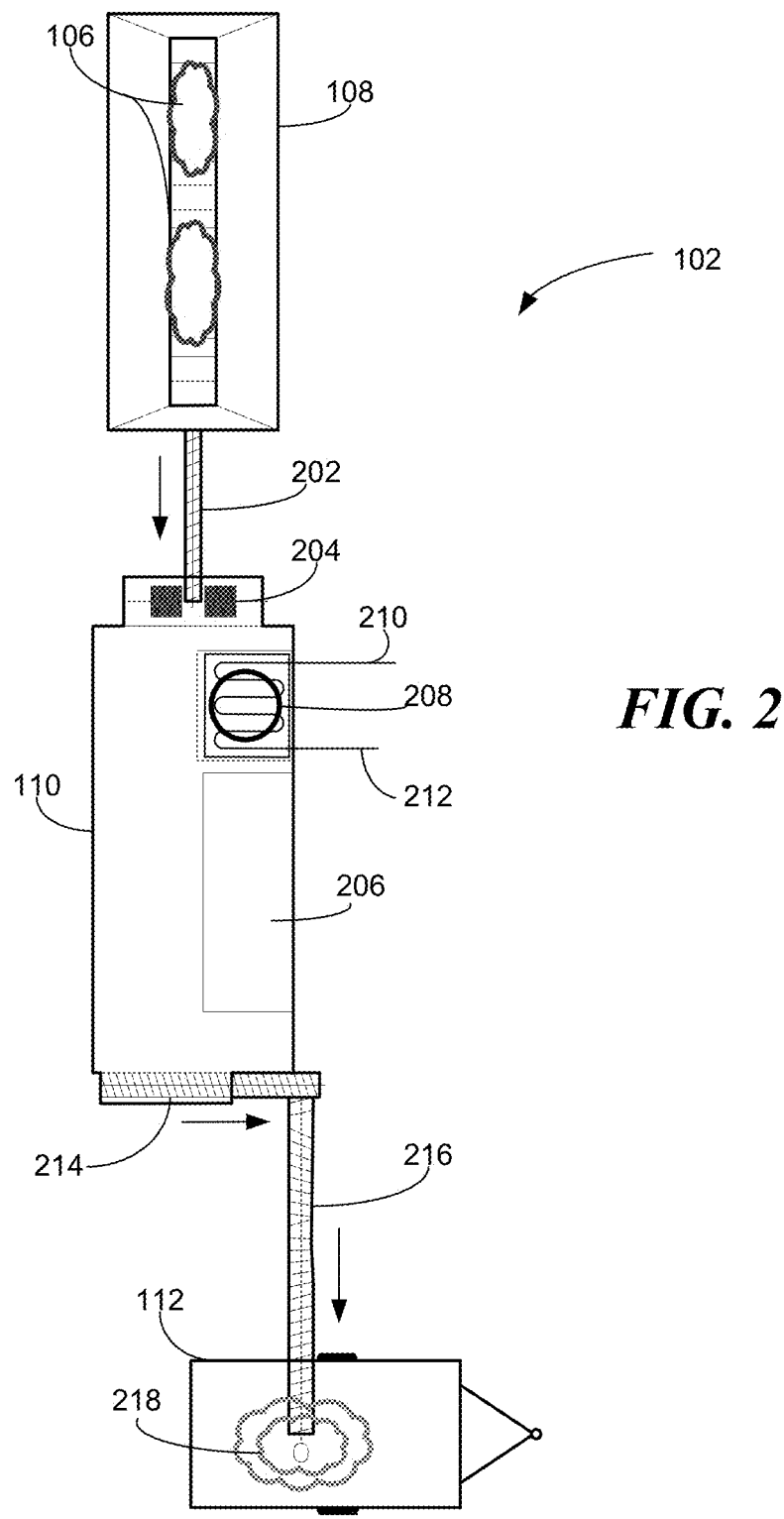
FIG. 2 is a process flow diagram of a gasifier depicted in FIG. 1 and related components.

Referring now to FIG. 2, the animal waste (e.g., poultry litter) is loaded into the manure spreader 108 or hopper. The animal waste 106 is then conveyed from the manure spreader 108 to the gasifier 110 using the feed auger 202. An agitator 204 may be secured to a front loading end of the gasifier 110 to help provide an even distribution of the animal waste and shake loose clumps of material into small portions for the gasifier 110. The gasifier 110 breaks down the animal waste and converts the energy from the animal waste to a hot flue gas. The hot flue gas passes through the heat exchanger 208.

The heat exchanger 208 transfers a portion of the thermal energy to a closed loop circulating clean water supply. As cool water 210 is piped into the heat exchanger 208, heat is transferred to the cool water 210 and is piped out of the heat exchanger 208 as heated water 212. The heated water 212 is circulated through the organic Rankine cycle system (described below) where the thermal energy stored in the water is used to produce electrical energy. The resulting solids (ash) 218 from the combustion process contain non-organic material such as Phosphorus, Calcium, and other nutrients. This ash 218 is conveyed from the rear of the gasifier 110 to a storage container 112 using ash augers 214, 216.

Figure 3:
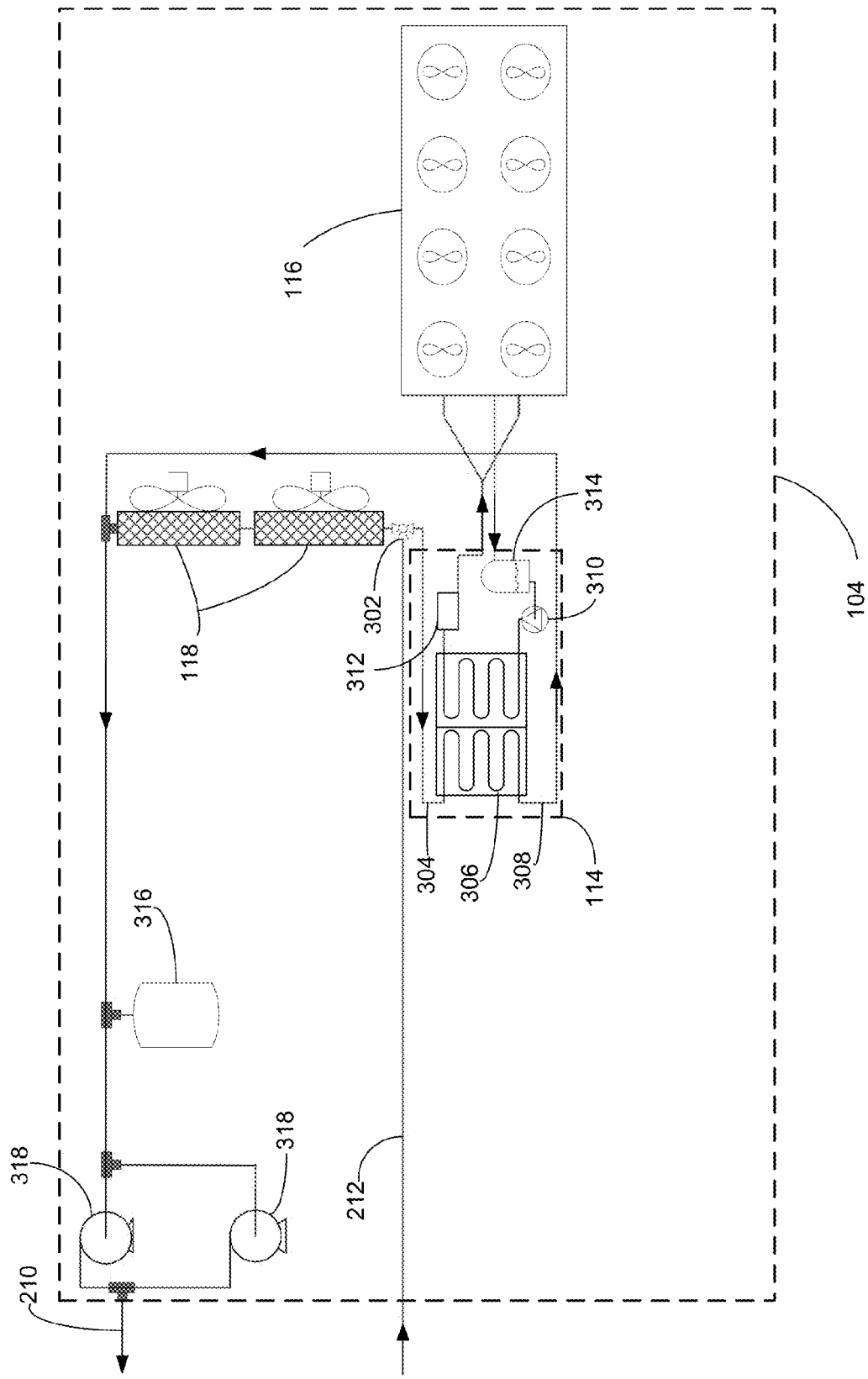
FIG. 3 is a process flow diagram of an organic Rankine cycle system to generate electricity.

Referring now to FIG. 3 that depicts the organic Rankine cycle system, water was chosen for several reasons. Water is inexpensive and does not pose a significant environmental threat if it leaks, it is not as dangerous as steam, it can be pumped great distances, and it is easy to store. There are two modes for using the hot water in the method and system. One is for heating the ambient air in animal barns, for example, where the hot water may be pumped through hot water radiant heaters to most effectively distribute the heat. The other mode is to generate electricity. The bi-modal system provides the ability to variably switch between producing electricity and heat by switching valves and directing the flow of the hot water. As more electricity is desired, more flow of the heated water can be directed to the organic Rankine cycle system. Likewise, as more radiant heat is needed, more heated water is directed to the radiant heaters. The system can simultaneously produce both electricity and radiant heat or produce one or the other exclusively as needed. Hot water storage tanks may also be utilized to store hot water to take further advantage of the peaks and changing needs for heat.

As described above, if heat is not needed, the heated water 212 may be diverted in whole or in part, to the organic Rankine cycle system 114, where the thermal energy will be used to generate electricity. The Rankine cycle is the thermodynamic cycle used in power plants around the world (steam cycle). In the system 100 disclosed herein, the organic Rankine cycle uses a refrigerant instead of steam to take advantage of lower operating temperatures and pressures. This provides a way of producing electricity on a much smaller scale and cheaper when compared to a standard steam turbine generator at the same scale.

In operation, heated water 212 is circulated from the gasifier to a three-way valve 302. As explained above, the valve 302 may be used to divert all or some portion of the heated water 212 to heat dumps 118 such as radiators to heat the ambient air. The water circulates through the radiators 118 and may be connected in series with a surge tank 316 to accommodate fluctuations in flow and pressure in the piping. The water continues to be pumped using water pumps 318 to return the cooled water 210 to the heat exchanger of the gasifier 110 and to repeat the flow path.

Alternatively, if heat is not needed, the valve 302 may divert the flow of heated water to inlet piping 304 of an evaporator 306 of the organic Rankine cycle system. This in turn heats liquid refrigerant circulating through separate parallel piping of the evaporator 306 using a refrigerant pump 310. The expansion of the pressurized refrigerant vapor produces power and a generator 312 produces electricity. Subsequently, the refrigerant returns to a liquid state as it passes through a condenser 116 and returns to a receiver 314.

Figure 4:
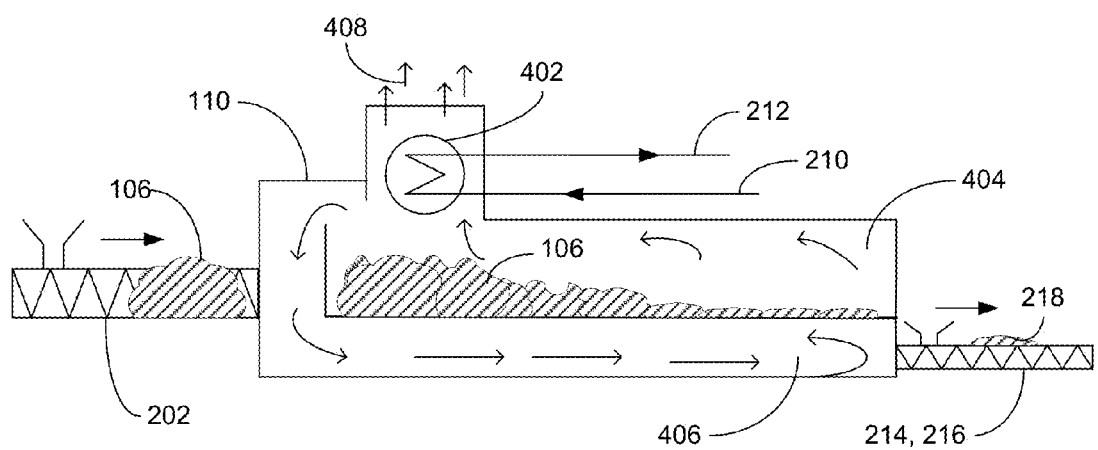
FIG. 4 is a schematic sectional view through the gasifier and heat exchanger depicted in FIG. 1.

Referring now to FIG. 4, the gasifier 110 includes two chambers: a lower burner chamber, referred to as the secondary chamber 406, and an upper gasification or primary chamber 404. Hot gases 408 from the burner heat refractory bricks lining the secondary and primary chambers. A feedstock 106 is augured on the hearth of the primary chamber 404 where it is indirectly heated to 600-1000° C. (1100-1800° F.) by heat transfer through the refractory bricks and the hearth. As the feedstock 106 is broken down, or cracked, into low molecular weight gases and volatile hydrocarbons, these products are drafted into the burner chamber through a small opening at the top of the back wall. Energy from the out-gases provides fuel to sustain the process. Temperature, oxygen, feedstock rate, and residence time can be controlled during the reaction. This control and the natural flow of the system result in a very clean process that meets the emission standards both in Europe and California without requiring gas cleanup. The ash 218 consists almost exclusively of mineral compounds with virtually no carbon char remaining, less than 10% by weight.

Figure 5:
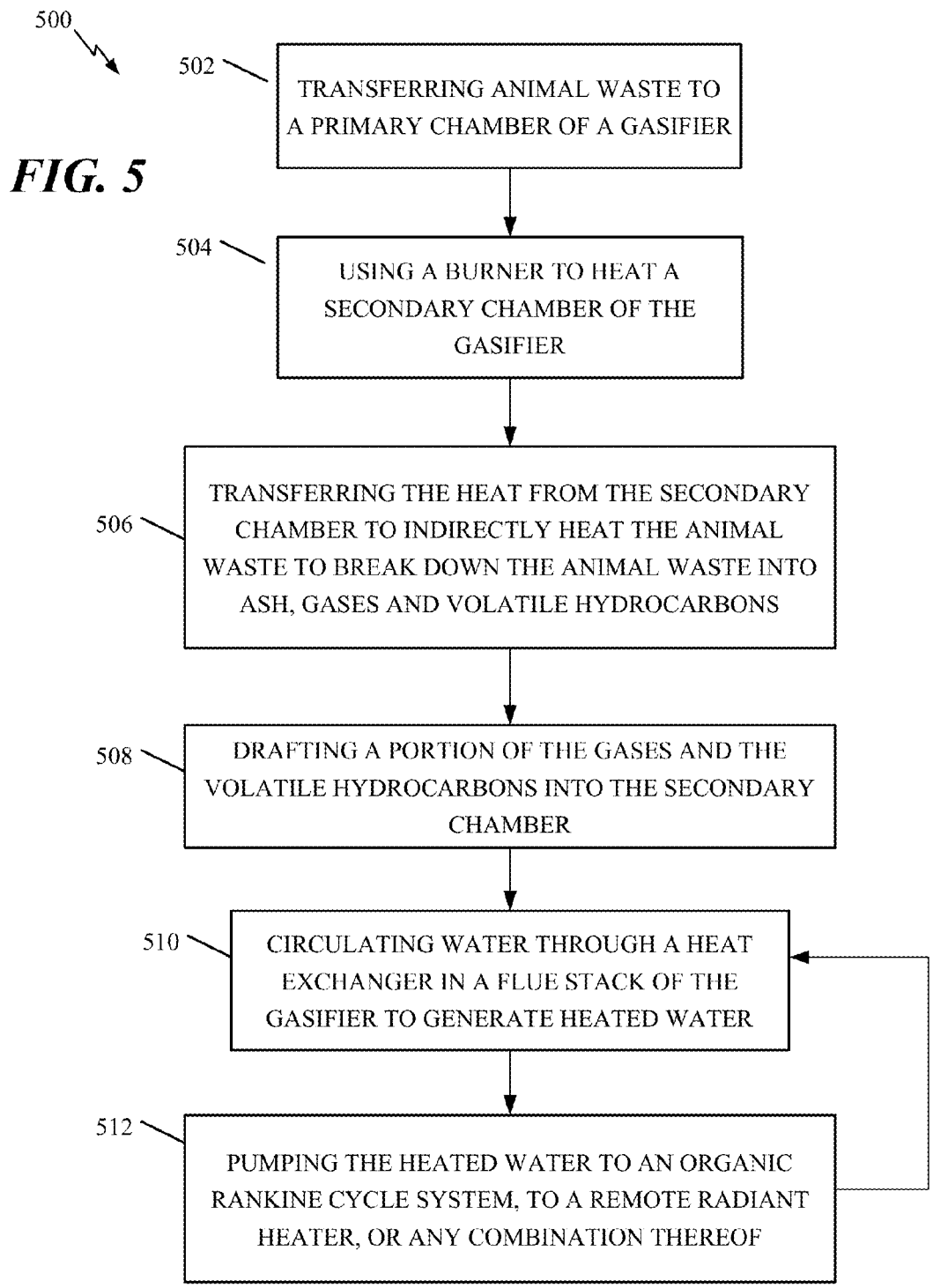
FIG. 5 is a flow diagram of a method to process animal waste.

A flow diagram of a particular embodiment of the method for processing animal waste is described in FIG. 5 and generally designated 500. At 502, animal waste is transferred to a primary chamber of the gasifier. A burner is used to heat a secondary chamber of the gasifier, at 504. The heat is transferred, at 506, from the secondary chamber to indirectly heat the animal waste to break down the animal waste into ash, gases and volatile hydrocarbons. At 508, a portion of the gases and the volatile hydrocarbons are drafted into the secondary chamber. The water is circulated through a heat exchanger in a flue stack of the gasifier to generate heated water, at 510. The heated water is pumped, at 512, to an organic Rankine cycle system, to a remote radiant heater, or any combination thereof.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of processing animal waste comprising:
   using a gasifier comprising a secondary chamber integrated under a primary chamber, and partially separated from the primary chamber by a heat transfer material lining the secondary and primary chambers;
   transferring animal waste to the primary chamber of the gasifier;
   using a burner to produce heat in the secondary chamber of the gasifier;
   indirectly heating the animal waste in the primary chamber using the heat from the secondary chamber to heat the heat transfer material lining the secondary and primary chambers to a temperature to drive off water and lower energy hydrocarbons from the animal waste in order to break down the animal waste into ash, gases and volatile hydrocarbons and to cause exothermic reactions in the primary chamber in order to increase the temperature therein to drive off the remaining carbon and begin oxidation of the animal waste in the primary chamber;
   drafting a portion of the gases and the volatile hydrocarbons from the primary chamber into the secondary chamber for complete oxidation of the animal waste;
   circulating water through a heat exchanger in a flue stack of the gasifier; and
   transferring the heated water to an organic Rankine cycle system to generate electricity, to a remote radiant heater, to storage, to discharge, or any combination thereof.

2. The method of claim 1, further comprising:
vaporizing a refrigerant by circulating the heated water through an evaporator of the organic Rankine cycle system; and
circulating the vaporized refrigerant from the evaporator through a turbine to generate the electricity.

3. The method of claim 2, further comprising:
varying a feedrate of transferring the animal waste to the primary chamber that is based on contemporaneously calculating British thermal units (BTU) of the animal waste and varying the feedrate in response.

4. The method of claim 3, wherein the animal waste is poultry litter.

5. The method of claim 4, wherein transferring the animal waste to the primary chamber comprises loading the animal waste into a manure spreader that is connected to a feed auger that transfers the animal waste from the manure spreader to the primary chamber.

6. The method of claim 5, further comprising removing the ash from the primary chamber using an ash auger.

* * * * *